US010344708B1

(12) United States Patent
Harris et al.

(10) Patent No.: US 10,344,708 B1
(45) Date of Patent: Jul. 9, 2019

(54) ENGINE VIBRATION ISOLATION SYSTEM (71) Applicant: Northwest ULD, Inc., McMinnville, OR (US)

(72) Inventors: Chris B. Harris, Amity, OR (US); Gregory J. Stadeli, Silverton, OR (US); Dean W. Glass, Carlton, OR (US)

(73) Assignee: NORTHWEST ULD, INC., McMinnville, OR (US)

(*) Notice: Subject to any disclaimer, the term of this patent is extended or adjusted under 35 U.S.C. 154(b) by 309 days.

(21) Appl. No.: 15/584,704

(22) Filed: May 2, 2017

Related U.S. Application Data (60) Provisional application No. 62/330,691, filed on May 2, 2016.

(51) Int. Cl.
*F02F 7/00* (2006.01)
*B64D 27/04* (2006.01)
*B64D 27/26* (2006.01)
*F02B 61/04* (2006.01)
*B64C 39/02* (2006.01)

(52) U.S. Cl.
CPC .......... *F02F 7/0082* (2013.01); *B64C 39/024* (2013.01); *B64D 27/04* (2013.01); *B64D 27/26* (2013.01); *F02B 61/04* (2013.01); *B64C 2201/044* (2013.01); *F02F 2200/06* (2013.01)

(58) Field of Classification Search
CPC ...... F02F 7/0082; B64C 39/024; B64D 27/04; B64D 27/26; F02B 61/04
USPC .......................................................... 244/54
See application file for complete search history.

(56) References Cited

U.S. PATENT DOCUMENTS

| | | | |
|---|---|---|---|
| 2,720,370 A | 10/1955 | Hasbrouck | |
| 4,293,114 A * | 10/1981 | Lykes | F16M 1/04 248/604 |
| 5,107,809 A * | 4/1992 | Suh | F02F 7/0053 123/195 H |
| 6,041,901 A * | 3/2000 | Werner | B60K 6/26 192/3.28 |
| 7,487,747 B2 | 2/2009 | Kamiyama et al. | |
| 2003/0015166 A1 * | 1/2003 | Seymour | F02B 61/04 123/198 R |
| 2004/0020702 A1 * | 2/2004 | Oshima | B60K 5/1208 180/291 |
| 2008/0006739 A1 * | 1/2008 | Mochida | B64C 27/04 244/60 |
| 2008/0178857 A1 * | 7/2008 | Kamiyama | F02B 75/041 123/78 C |

* cited by examiner

*Primary Examiner* — Bret Hayes
(74) *Attorney, Agent, or Firm* — Marsh Fischmann & Breyfogle LLP (57) ABSTRACT

An engine assembly having an improved mounting system or assembly is disclosed. Features of this mounting system include having crankcase arms that are integrally formed with a crankcase of the engine assembly, having multiple mounting legs that each have a dedicated vibration damping subassembly and where the stiffness of at least two of the mounting legs is different (by varying the configurations of the corresponding vibration damping subassemblies), and using a mounting ring or base with having differently oriented mounting pads for securement of the corresponding mounting leg relative thereto.

20 Claims, 11 Drawing Sheets

ENGINE VIBRATION ISOLATION SYSTEM

CROSS-REFERENCE TO RELATED APPLICATIONS

This patent application claims the benefit of U.S. Provisional Patent Application No. 62/330,691, that was filed on May 2, 2016, and the entire disclosure of which is hereby incorporated by reference.

FIELD

The present invention generally relates to the field of internal combustion engines and, more particularly, to addressing vibrations due to operation of the engine and including attempting to vibrationally isolate a small internal combustion engine from a vehicle body for at least certain applications, such as unmanned aerial vehicles, radio-controlled model aircraft, watercraft, and the like.

BACKGROUND

Internal combustion engines are used for many applications. Operation of the internal combustion engine may of course generate vibrations. In at least certain applications these vibrations may have an adverse impact on one or more aspects of a vehicle that incorporates such an internal combustion engine, such as unmanned aerial vehicles, radio-controlled model aircraft, watercraft, and the like.

SUMMARY

The following presents a simplified summary of the innovation in order to provide a basic understanding of some aspects of the innovation. This summary is not an extensive overview of the invention. It is intended to neither identify key or critical elements of the innovation nor delineate the overall scope of the invention. The sole purpose of this summary is to present some concepts of the innovation in a simplified form as a prelude to the more detailed description.

An objective of the present invention is to provide a method and apparatus for the isolation of the source vibration as caused by the motions of the engine and equipment coupled to it from the rest of the application in order to minimize the translation of the vibration in any of the six degrees of freedom (X,Y,Z, $\alpha,\beta,\gamma$) to the preferred application (e.g., airframe, marine bulkhead). The subject invention allows for the installation of the engine unit to a singular point in the desired applications, thereby allowing for ease of installation and maintenance access. The instant invention is unique in not only the composition and configuration of the vibration isolation and dampening components, it is unique in the mechanism of attachment of the vibration isolation assembly directly to the engine crankcase.

An object of the instant invention is to provide a compliant engine mounting system which is singularly integrated from the crankcase arms to the mounting location in order to maximize vibration isolation and dampening created by the engine and the vibration received from the application frame.

A first aspect of the present invention is embodied by an engine assembly that includes an engine and an engine mounting system. The engine assembly includes an engine housing. The engine mounting system includes a mounting base and a plurality of mounting legs that extend between the engine housing and this mounting base. In a first embodiment, the engine housing is in the form of a crankcase housing, and each mounting leg includes a crankcase arm that is integrally formed with this crankcase housing and that extends from the crankcase housing at least generally in the direction of the mounting base. In a second embodiment, a first mounting leg of the mounting system is of a first configuration and a second mounting leg of the mounting system is of a second configuration that is different from the first configuration. In a third embodiment, the mounting base includes a separate mounting pad for each mounting leg, where each such mounting pad is disposed in a different orientation than every other mounting pad.

A number of feature refinements and additional features are separately applicable to each of above-noted first, second, and third embodiments of the present invention. These feature refinements and additional features may be used individually or in any combination in relation to each of the first, second, and third embodiments. Initially, these embodiments may be used in any and all combinations relative to one another.

Any appropriate number of mounting legs may be utilized by the engine assembly, although three or more will typically be used for at least certain applications (e.g., aircraft or aerial vehicles; watercraft). A reference axis may be associated with the engine assembly. This reference axis may coincide with or may be parallel to a direction of motion provided by operation of the engine assembly, or may be characterized as extending in a largest dimension of the engine assembly. The mounting legs used by the engine mounting system may be spaced about such a reference axis (e.g., using an equal radial spacing about this reference axis). One embodiment has each mounting leg being oriented such that its end at the engine housing (e.g., crankcase housing) is disposed closer to this reference axis than its end at the mounting base.

A crankcase arm for each mounting leg may be integrally formed with the engine housing (e.g., a crankcase housing). For instance, the engine housing and the crankcase arm of each mounting leg may be integrally formed (e.g., of one-piece construction; such that there is not a joint between the engine housing and the crankcase arm of each mounting leg). Regardless of how each crankcase arm is integrated with the engine housing, each crankcase arm may be characterized as being in the form a cantilever, having one end that is secured relative to the engine housing and having an oppositely-disposed free end. Such a free end may be spaced beyond an end of the engine housing. In one embodiment at least part of each crankcase arm diverges away from the above-noted reference axis in proceeding in a direction of the mounting base.

Each mounting leg may be secured relative to the mounting base in any appropriate manner, for instance using a detachable connection (e.g., using one or more fasteners). One embodiment has an end of a vibration damping subassembly for each mounting leg being detachably secured relative to the mounting base. These anchoring locations may be spaced (e.g., equally) about a central axis about which the mounting base may be disposed (e.g., the above-noted reference axis). For instance, the mounting base may be an annular structure of any appropriate configuration, including circular. The mounting base may also be characterized as having a closed perimeter wall or one that extends a full 360° about a central axis. A corresponding end of each such mounting leg may be appropriately secured relative to this perimeter wall of the mounting base.

A vibration damping subassembly for each mounting leg may be of any appropriate configuration. "Vibration damping" encompasses damping vibrations caused by operation of the engine assembly prior to reaching the mounting base. "Vibration damping" also compasses completely isolating (vibrationally) the engine assembly from the mounting base. One or more vibration damping members may be utilized by the vibration damping subassembly for each mounting leg, including where a plurality of vibration damping members are disposed between their corresponding crankcase arm and the mounting base so as to be in spaced relation to one another. At least one mounting leg for the engine mounting system may be stiffer than at least one other mounting leg for the engine mounting system. This difference in stiffness may be realized by using different configurations for the various mounting legs (e.g., their respective vibration damping subassemblies, including using different arrangements of a common set of vibration damping members or vibration dampers).

A crankcase arm for each mounting leg may include a mounting flange. Such a mounting flange may define a free end for the corresponding crankcase arm. One embodiment has a first vibration damping member being disposed on and/or contacting a side of the mounting flange that at least generally projects in the direction of the crankcase housing. A cap may be disposed over this first vibration damping member. A second vibration damping member may be disposed on and/or contact an opposite side of the crankcase arm mounting flange (in relation to the first vibration damping member). A first end of a housing may include a tip that extends into its corresponding second vibration damping member, where this housing is part of the vibration damping subassembly for the corresponding mounting leg. This housing for each of the mounting legs may be maintained in a fixed position relative to its corresponding crankcase arm mounting flange.

A vibration damping subassembly for each mounting leg may include a vibration mount. The vibration mount for each mounting leg may be of a common configuration. One embodiment has such a vibration mount including first, second, and third vibration mount flanges, with the first vibration mount flange being disposed closest to the engine housing (e.g., crankcase housing), with the third vibration mount flange being disposed closest to the mounting base, and with the second vibration mount flange (e.g., an intermediate vibration mount flange) being disposed between its corresponding first and third vibration mount flanges. A vibration damper may be disposed on the engine housing side of the vibration mount for a first of the mounting legs but not on the engine housing side of the vibration mount for a second of the mounting legs, while a vibration damper may be disposed on the mounting base side of the vibration mount for the second of the mounting legs but not on the mounting base side of the vibration mount for the first of the mounting legs. This provides different stiffnesses/stiffness and dampening characteristics for the first and second mounting legs.

Consider the case where the engine mounting system includes three mounting legs, and where a cylinder head for the engine may be characterized as being positioned above a central axis for the engine assembly (e.g., the above-noted reference axis). Two of the mounting legs may also be positioned above this central axis and one of the mounting legs may be positioned below this central axis, where the two mounting legs that are positioned above the central axis are stiffer than the single mounting leg that is positioned below the central axis. Another characterization is that two of the mounting legs for the noted embodiment are above a horizontal reference plane when a mounting location for the crankcase housing (e.g., a mounting location for a cylinder head or block) is projecting vertically and orthogonally upward relative to this horizontal reference plane (e.g., an upright orientation of a vehicle that incorporates the engine assembly), while the third mounting leg is below this same horizontal reference plane, again where the pair of mounting legs (more specifically their corresponding vibration damping subassemblies) that are above the horizontal reference plane are configured to be stiffer than the mounting leg (more specifically its corresponding vibration damping subassembly) that is disposed below this same horizontal reference plane.

The mounting base may include a separate mounting pad for each mounting leg, where each mounting pad of the mounting base is disposed in a different orientation than every other mounting pad incorporated by the mounting base. The mounting pads for the mounting base may be oriented so that a mounting surface for these mounting pads projects in a converging relationship relative to the mounting surface for every other mounting pad. The mounting surface for each mounting pad may project at least generally in the direction of the above-noted reference axis.

An internal combustion engine may be utilized by the engine assembly. Such an engine assembly may use its engine mounting to mount (e.g., detachably) to a vehicle body (e.g., an airframe of an aircraft or aerial vehicle; a bulkhead of a watercraft).

BRIEF DESCRIPTION OF THE DRAWINGS

FIG. 6b a partially exploded, perspective of the engine assembly application shown in FIG. 6a.

FIG. 6c is an end view of engine assembly application shown in FIG. 6a.

DETAILED DESCRIPTION

A representative engine assembly 2 is shown in FIGS. 1-4, and includes a crankcase or crankcase housing 10, along with a mounting ring or base 13 that is spaced from this crankcase housing 10 along a central reference axis 5 and that may be characterized as being part of an engine mounting assembly or system 4. Generally, this engine mounting system 4 further includes plurality of mounting legs 6 and 6a (three in the illustrated embodiment, although additional mounting legs may be utilized as desired/required; mounting leg 6a differing from the other two mounting legs 6, and thereby an additional "a" is used for its identification) that are spaced about this reference axis 5, that each extend between the crankcase housing 10 and the mounting ring 13, and that each include what may be characterized as a corresponding crankcase arm 11 and a corresponding vibration damping subassembly 8, 8a (vibration damping subassembly 8a for the mounting leg 6a being of a different configuration than the vibration damping subassembly 8 for the other two mounting legs 6, and thereby an additional "a" is used for its identification). The mounting ring 13 is attachable to an appropriate vehicle or vehicle body, such as an aircraft (e.g., its airframe) or watercraft (e.g., its bulkhead).

The engine assembly 2 shown in FIGS. 1-4 may include an engine in the form of an internal combustion engine. In this regard, an engine or cylinder block may be mounted to the crankcase housing 10 at the mounting location 12, and a cylinder head may be appropriately mounted to this engine block. The engine block may be of any appropriate configuration (e.g., incorporating one or more cylinders, with each cylinder having a corresponding reciprocating piston disposed therein; where a crankshaft of the engine (disposed with the crankshaft housing 10) reciprocates one or more of these pistons in a timed relation). The cylinder head closes the upper end of the cylinder(s) being utilized by the engine, and may be configured to direct air and/or fuel into each of the cylinders of the engine as well as to allow exhaust gases to be discharged from each of the cylinders of the engine. The cylinder head may also include intake and/or exhaust valves, spark plugs, and the like. In any case, the cylinder head may be characterized as being aligned with the mounting location 12 on the crankcase housing 10, and may be directly or indirectly interconnected with the crankcase housing 10 at this mounting location 12. The above-noted central reference axis 5 for the engine assembly 2 may coincide with the rotational axis of the above-noted crankshaft, may coincide with a rotational axis of a propeller (not shown, but address below) used by the engine assembly 2, or both.

The center of the moment of inertia of the engine assembly 2 shown in FIGS. 1-4 may vary with engine rotational speed. When applied to the current configuration of an Unmanned Aerial Vehicle (UAV), the engine operates in the majority of the run time in "normal" cruising speed during which the center of the moment of inertia is located towards the generator. The three mounting legs 6, 6a for the engine mounting system 4 in the illustrated embodiment each include a crankcase arm or upper section 11 for the corresponding mounting leg 6, 6a, which are uniquely integrated with the crankcase or crankcase housing 10, and are aligned towards that position as they spread out rearward to their angled airframe pick-up points on the bulkhead or mounting base/ring 13. This crankcase configuration facilitates the decoupling of the vibration from the engine assembly 2 at the attachment to the mounting ring 13 located behind the engine.

One advantage particular to UAV applications is the limited transfer of torsional impulse forces from the operation of the engine used by the engine assembly 2. In the configuration of the engine assembly 2 shown in FIGS. 1-4, the resultant torsional vibration is so low that it should not affect the proper operation or stability of typical applied payload sensors, such as a camera.

An additional advantage of engine mounting system 4 is the reduction of individual assembly parts required to mount the engine from the crankcase 10 to the engine mounting system 4. In the known prior art, the engine mount and vibration isolation components were assembled separate to the crankcase and then attached with a dedicated mounting location on the crankcase assembly. The engine assembly 2 is a non-partitioned singular assembly attached at and integrated into the crankcase 10.

Each mounting leg 6, 6a of the engine mounting system 4 again includes a crankcase arm 11 (or upper section) and a corresponding vibration damping subassembly 8, 8a (or lower section). The crankcase arm 11 for each mounting leg 6, 6a is integrally formed with the engine crankcase housing 10. That is, the crankcase housing 10 in each crankcase arm 11 is of one-piece construction, such that there is no joint of any kind between the crankcase housing 10 and any of the crankcase arms 11. Each crankcase arm 11 includes a diverging section 11a and a mounting flange, base, or foot 11b at the free end of the corresponding crankcase arm 11. Section 11a for each crankcase arm 11 diverges relative to the central reference axis 5 proceeding in the direction of its corresponding mounting flange 11b.

Figure 1:
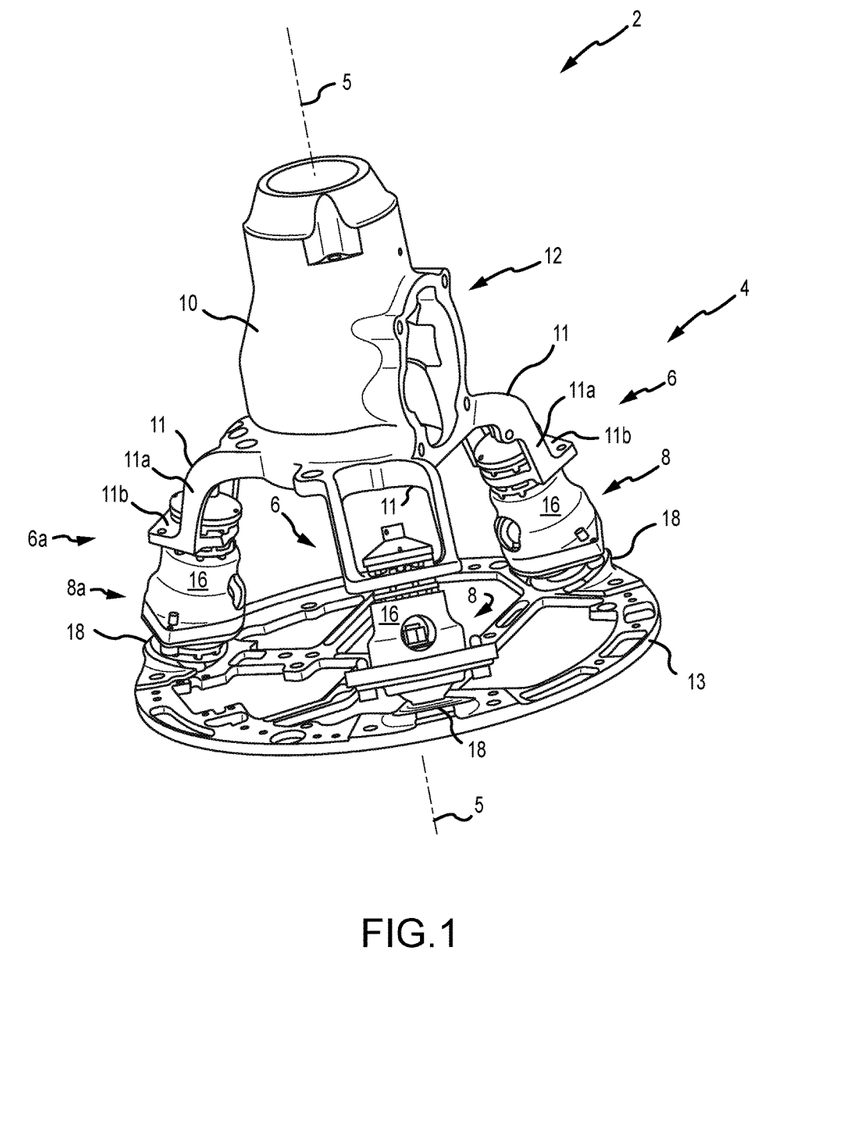
FIG. 1 is a perspective view of an engine assembly and an integrated mounting assembly or system for attachment to a vehicle body.
Figure 2:
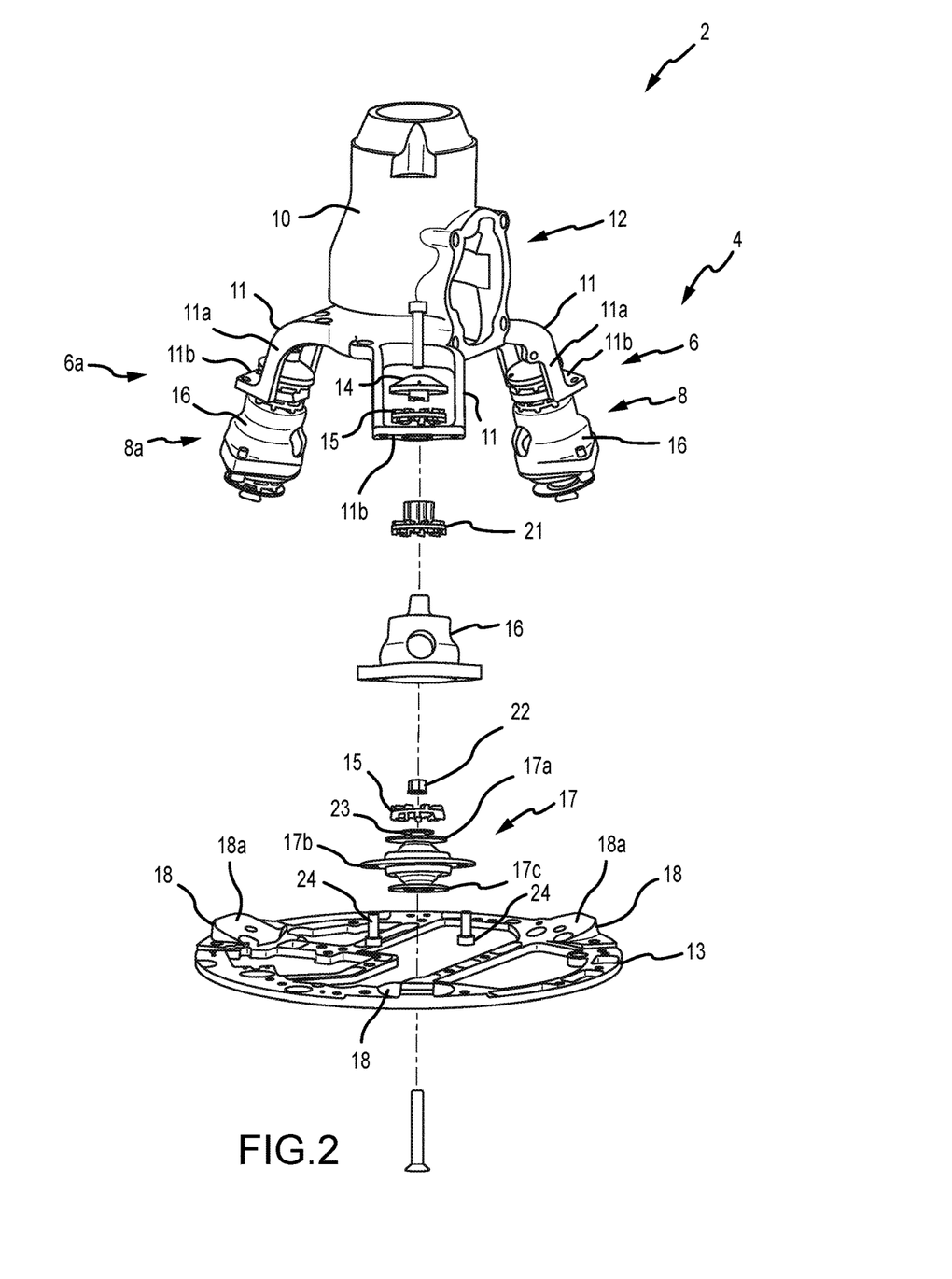
FIG. 2 is an exploded, perspective view of a portion of the engine assembly shown in FIG. 1, namely to illustrate the configuration of a vibration damping subassembly used by two of the mounting legs for the engine mounting system of the illustrated embodiment.
Figure 3:
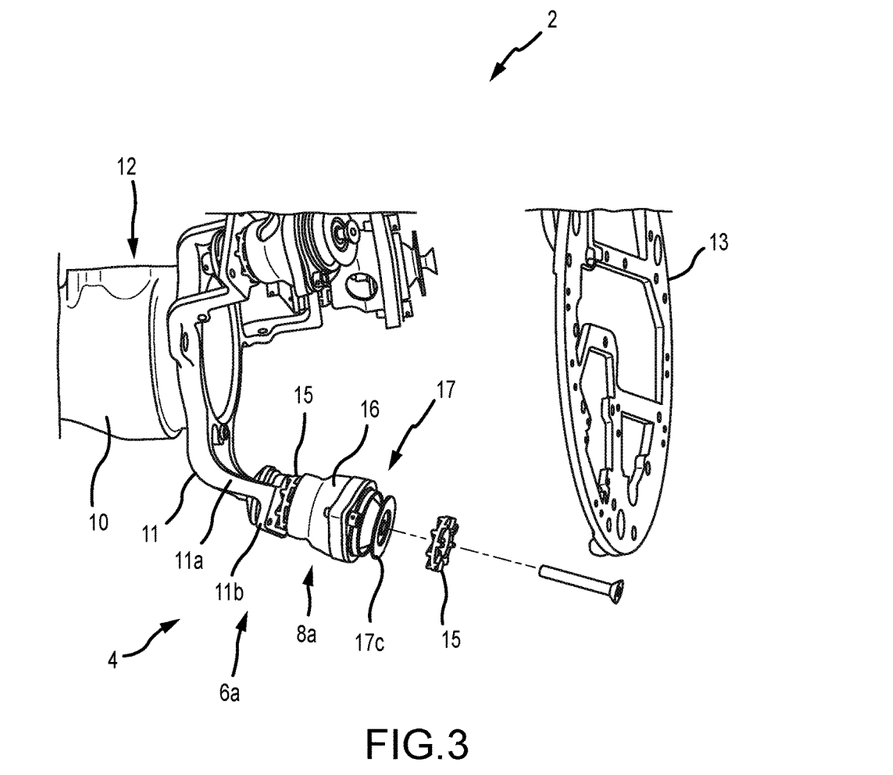
FIG. 3 is an exploded, perspective view of a portion of the engine assembly shown in FIG. 1, namely to illustrate the configuration of a vibration damping subassembly used by a third mounting leg for the engine mounting system of the illustrated embodiment.
Figure 4:
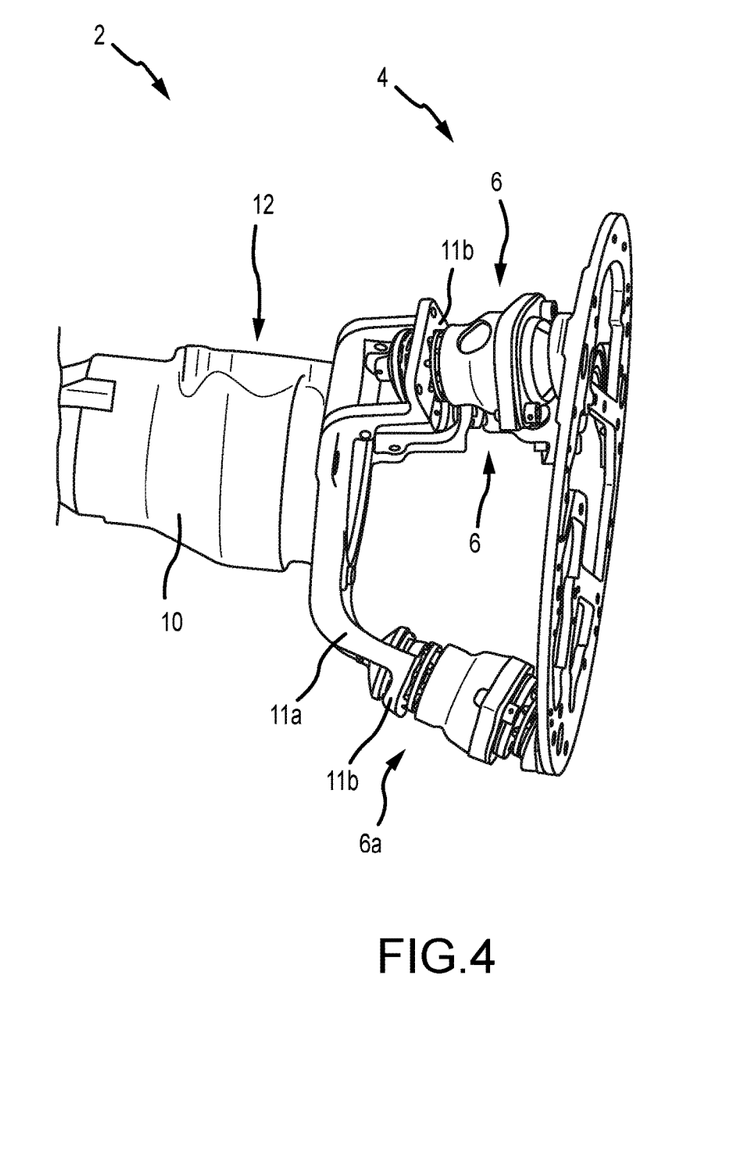
FIG. 4 is another perspective view of the engine assembly shown in FIG. 1.

Each mounting leg 6, 6a of the engine mounting system 4 also includes a corresponding vibration damping subassembly or lower section 8, 8a as noted. Referring primarily now to FIGS. 2 and 3, each vibration damping subassembly 8, 8a includes a uniquely configured cap 14, a vibration isolator bushing 21, a vibration isolating ring 15 and a vibration mount 17 (e.g., low profile) that are held encapsulated within a goblet-like metal housing 16, and then attached to or structurally interconnected with the mounting ring or base 13.

In the embodiment shown in FIGS. 1-4 and as noted, there are three mounting legs 6, 6a that each extend from the crankcase housing 10 to the mounting ring 13, although four or more mounting legs could also be utilized. The above-noted mounting legs 6, 6a may be equidistantly-spaced about the central reference axis 5, with the crankcase housing 10 and the mounting ring 13 being spaced along this reference axis 5. The lower sections 8, 8a of the mounting legs 4 ("lower" being in the direction of the mounting ring 13) are also disposed in diverging relation to this reference axis 5 in progressing to the mounting ring 13. Each such mounting leg 6, 6a includes a crankcase arm 11 that is integrally-formed with the crankcase housing 10 as noted (e.g., there is no joint of any kind between each of the crankcase arms 11 and the crankcase housing 10; the crankcase housing 10 and each of the crankcase arms 11 may be defined by a common casting).

It is important to note that the sequencing of the ring mounts and vibration isolators can be varied in accordance with the orientation of the cylinder head relative to the airframe (again, where the cylinder head would be disposed in alignment with the mounting location 12 on the crankcase housing 10). This feature allows for the engine mount configuration (e.g., engine mounting system 4) to be easily adapted to the center of gravity (load) applied relative to the bulkhead ring and application frame.

The upper, or non-variable portion of the vibration damping subassemblies 8, 8a of the engine mount assembly 4 ("upper" being in the direction of the crankcase assembly 10) includes a custom standoff washer in the form of the noted cap 14, a vibration isolating ring 15 (or vibration damper 15) seated into the corresponding cap 14, and a vibration isolator bushings 21 (or vibration damper 21) paired with the vibration isolating ring 15 and seated onto the unique engine mount goblet 16. The standoff washer or cap 14 and vibration isolating ring 15 are mounted above or on top of a flange, base, or "foot" 11b that is located at the free end of the corresponding crankcase arm 11. The vibration isolator bushing 21 is seated into the corresponding vibration isolating ring 15 from below and through a slot in the crankcase arm mounting flange, base or foot 11b (again, at the end of the corresponding crankcase arm 11). These components are sequenced in the series specified and shown in FIG. 2, and mounted axially to the corresponding crankcase arm mounting flange 11b. It should be noted that in the illustrated embodiment, each of the crankcase arm mounting flanges 11b is spaced from the end of the crankcase housing 10 relative to the noted reference axis 5 (e.g., each crankcase arm mounting flange 11b is disposed between the end of the crankcase housing 10 and the mounting ring 13, relative to the noted reference axis 5). In addition, each crankcase arm mounting flange 11b is spaced further from the central reference axis 5 than the end of its corresponding crankcase arm 11 at the crankcase housing 10.

The upper assembly for each vibration damping subassembly, as described above, is mounted to its corresponding lower assembly and ultimately onto the mounting ring 13. In the case of the two vibration damping subassemblies 8 and referring to FIG. 2, the components of the unique and flexible lower assembly include a nut 22, another vibration isolating ring 15 (or vibration damper), a washer 23, and an all attitude low profile vibration mount 17 (the vibration mount 17 for each of the mounting legs 6, 6a includes an upper flange 17a, an intermediate flange 17b, and a lower flange 17c). The "lower" vibration isolating ring 15 shown in the view of FIG. 2 is positioned between the upper flange 17a and the intermediate flange 17b of the vibration mount 17, and the washer 23 is positioned on an upper surface of the upper flange 17a of the vibration mount 17.

The sequencing of the components of the lower assembly into the bulkhead creates differential loading profiles based on the position of the cylinder head relative to the mounting ring 13. Two (2) of the three (3) lower assemblies oriented in the direction of the cylinder head mounting location 12 on the crankcase housing 10 (namely those associated with the two mounting legs 8 in the illustrated embodiment) have the assembly sequence (as from the crankcase arm base or foot 11b downward towards the mounting ring 13) of: ring vibration mount 15, washer 23 and low profile vibration mount 17. The third assembly (namely that associated with vibration damping subassembly 8a) does not include a vibration isolating ring 15 between the upper flange 17a and the intermediate flange 17b of its corresponding low profile vibration mount 17. Instead, the vibration damping subassembly 8a includes a vibration isolating ring 15 that is positioned between the intermediate flange 17b and the lower flange 17c of its corresponding low profile vibration mount 17 and as shown in FIG. 3.

In accordance with the foregoing, the vibration damping subassembly 8 for the two mounting legs 6 are of a common first configuration, while the vibration damping subassembly 8a of the third mounting leg 6a is of a second configuration that is different from the first configuration. The noted second configuration may be less stiff than the noted first configuration, and the mounting leg 6a having a vibration damping subassembly 8a of this less stiff second configuration may be located directly opposite of the cylinder head for the engine assembly (i.e., separated by a radial angle of 180 degrees relative to the noted reference axis along which the crankcase housing 10 and mounting ring 13 are spaced). Another characterization is that the two mounting legs 6 in the illustrated embodiment are above a horizontal reference plane when the mounting location 12 for the crankcase housing 10 is projecting vertically and orthogonally upward relative to this horizontal reference plane (e.g., an upright orientation of a vehicle that incorporates the engine assembly 2), while the mounting leg 6a is below this same horizontal reference plane, again where the mounting legs 6 (more specifically their corresponding vibration damping subassemblies 8) are configured to be stiffer than the mounting leg 6a (more specifically its corresponding vibration damping subassembly 8a).

The engine assembly 2 again includes, in each vibration subassembly, a short "goblet" 16 as applied to house a lower section of the corresponding vibration damping subassembly. This component of the vibration assembly uniquely allows for the axially unconstrained movement of the lower assembly as it absorbs the relative loading and shock loading from events such as runway or catapult launches and runway or net recoveries. The hollow core allows for this freedom of movement independent of the upper vibration mount assembly components. The perforations on the outer shape of the goblet mount are applied for weight reduction and/or maintenance/assembly purposes.

The vibration damping assembly for each of the mounting legs 6 and 6a is improved by the addition of safety wire and cable locking methods applied at the each of the corresponding standoff washer 14 and at the base of the corresponding goblet 16 when attached to the screws mounting the low profile vibration mounts 17 to the airframe or bulkhead using fasteners 24.

At least part of each of the noted mounting legs 6 are disposed in diverging relation to a central reference axis 5 in progressing to the mounting ring 13. In this regard, the mounting ring 13 includes a separate mounting pad 18 for each of the mounting legs 6, and with each of these mounting pads 18 being disposed in a different orientation than every other mounting pad 18 on the mounting ring 13. As at least a lower section of each mounting leg is disposed in the noted diverging relation, the various mounting pads 18 may be characterized as facing or projecting in converging relation to this same reference axis 5. Each mounting pad 18 may be in the form of a flat surface, and furthermore may be disposed orthogonal to the portion of the corresponding mounting leg 6 that extends from the mounting ring 13 toward the crankcase housing 10. An axis that is orthogonal to a given mounting pad 18 may then be characterized as being disposed in converging relation to the reference axis 5 (along which the crankcase housing 10 and mounting ring 13 are spaced) in proceeding away from its corresponding mounting pad 18.

Figure 5:
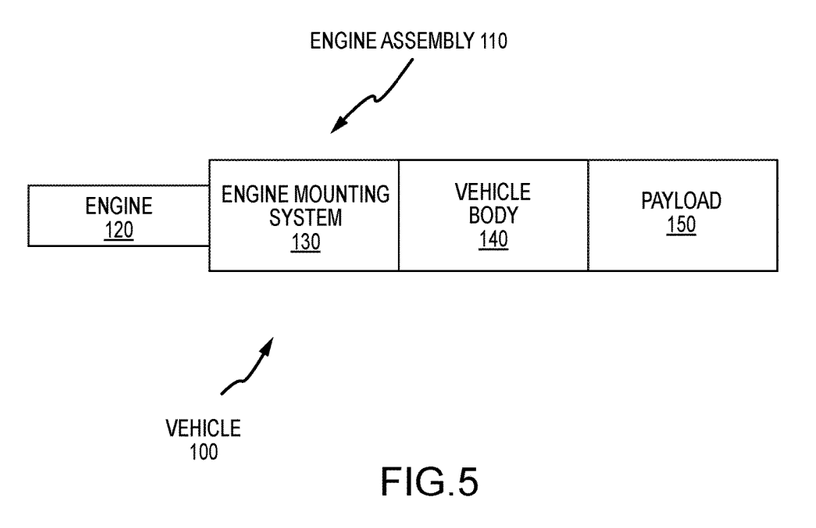
FIG. 5 is a schematic of a vehicle that may utilize the engine assembly shown in FIGS. 1-4.

A schematic of an embodiment of a vehicle is illustrated in FIG. 5 and is identified by reference numeral 100. The vehicle 100 may be of any appropriate type (e.g., aircraft; watercraft), and includes an engine assembly 110 (e.g., in accordance with FIGS. 1-4 discussed above), a vehicle body 140 (e.g., an airframe in the case of an aircraft; a bulkhead in the case of a watercraft), and an optional payload 150

(e.g., one or more sensors; imaging equipment such as one or more cameras). The engine assembly 110 in turn includes an engine 120 (e.g., an internal combustion engine; utilizing the above-noted crankcase housing 10) and an engine mounting system 130 (e.g., the mounting legs (each having a crankcase arm 11 and a vibration damping subassembly 8, 8*a*) and mounting ring 13 discussed above in relation to FIGS. 1-4).

Figure 6A:
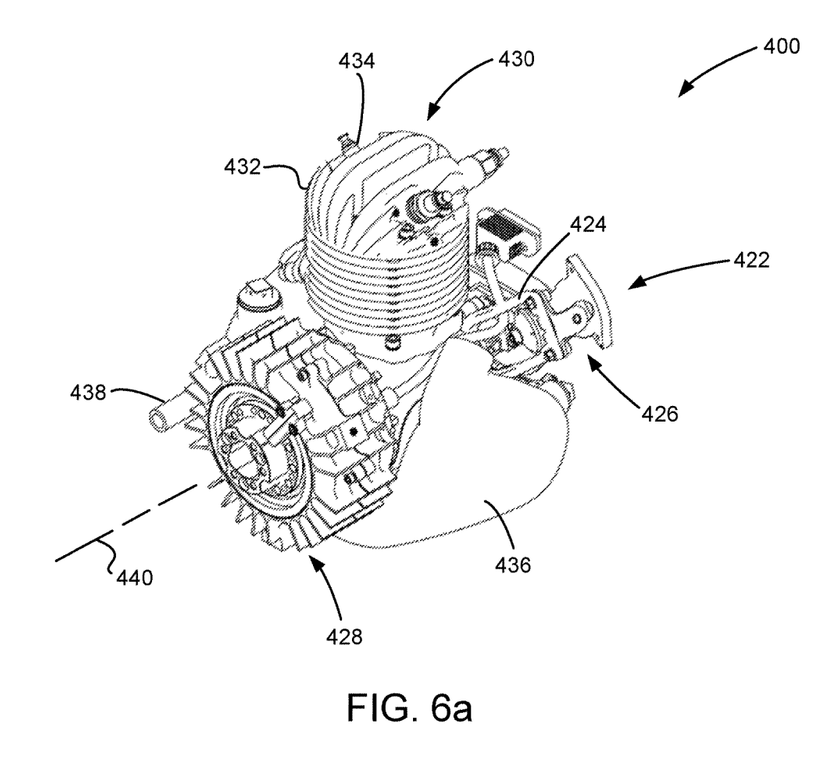
FIG. 6a is a perspective view of an embodiment of engine assembly for an aircraft or aerial vehicle application, and that uses a mounting system at least generally of the type shown in FIGS. 1-4.
Figure 6B:
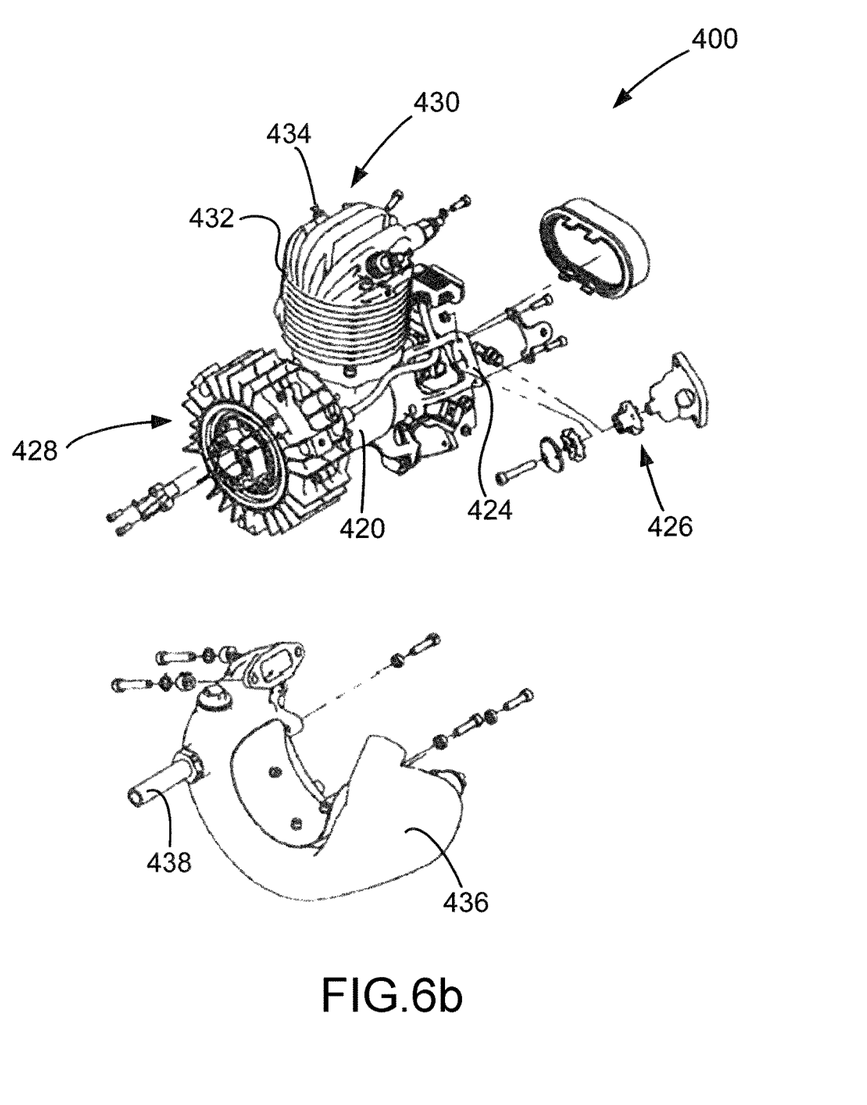
Figure 6C:
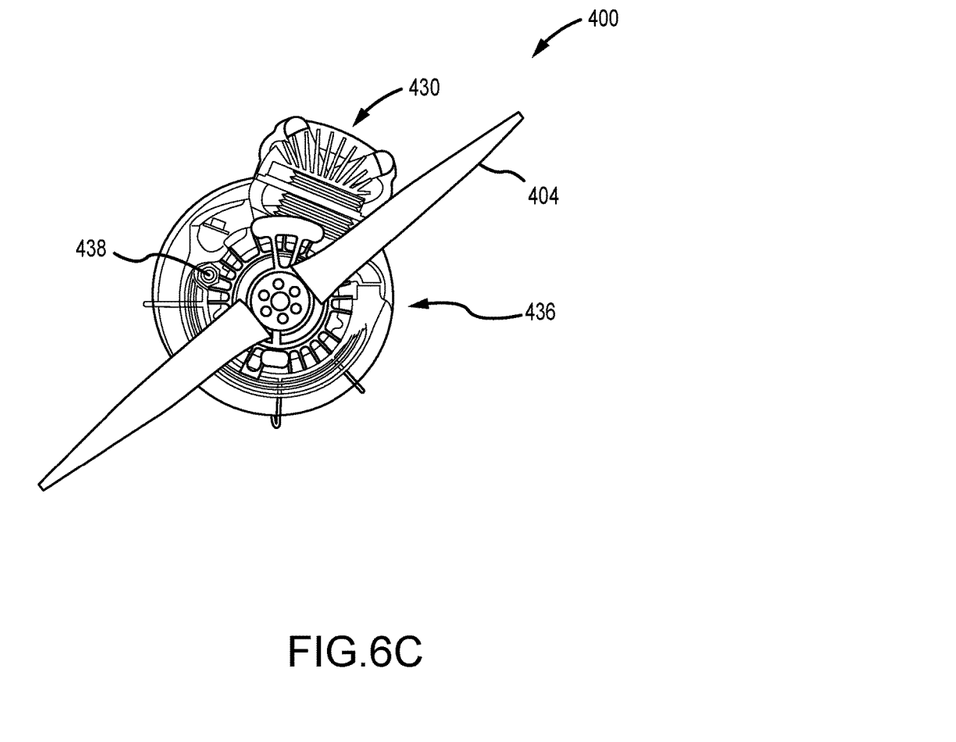

Another representative engine assembly is illustrated in FIGS. 6*a*-6*c* and is identified by reference numeral 400. The engine assembly 400 includes an engine case or crankcase housing 420 in which a rotatable crankshaft may be disposed (for instance at least generally in accordance with crankcase housing 10—FIGS. 1-4). A relevant portion of internal combustion engine 430 may be mounted to the crankcase housing 420 at least generally in the above-noted manner. In the illustrated embodiment, the engine 430 includes a single cylinder head 432 having a single combustion chamber. An air/fuel mixture within this combustion chamber is ignited by a pair of spark plugs 434. Exhaust gases may be discharged from this combustion chamber into a muffler 436, and thereafter may be directed into the environment through a stinger 438. The engine assembly 400 shown in FIGS. 6*a*-6*c* is of a push-type configuration—the airframe or body of the associated aircraft/aerial vehicle would be pushed through the air by operation of the engine 430 and rotation of the associated propeller.

The muffler 436 in FIGS. 6*a* and 6*b* proceeds about the crankcase housing 420 (e.g., about rotational axis 440), and may include an exhaust intake port 440. A flange associated with this exhaust intake port 440 may be secured to an exhaust header (not shown) of the cylinder head 432. The stinger 438 may extend out of an exhaust outlet port for the muffler 436.

The engine assembly 400 further includes an engine assembly mounting system in the form of a plurality of mounting legs 422 (for instance at least generally in accordance with mounting legs 230—FIGS. 1-4) that extend between the crankcase housing 420 and a mounting ring (not shown, but for instance at least generally in accordance with mounting ring 13—FIGS. 1-4). Each mounting leg 422 includes an upper section 424 (for instance at least generally in accordance with crankcase arms 11—FIGS. 1-4) that may be integrally formed with the crankcase housing 420, as well as a lower section 426 (for instance at least generally in accordance with vibration damping subassemblies 6—FIGS. 1-4).

The engine assembly 400 of FIGS. 6*a* and 6*b* may be mounted to an airframe of an aircraft or aerial vehicle (for instance at least generally in accordance with the discussion of FIGS. 1-4). In this case, the engine assembly 400 includes a propeller assembly 428 having a propeller 404. Operation of the engine 430 rotates a crankshaft within the crankcase housing 420, which in turn rotates the propeller assembly 428 (and its propeller 404) about a rotational axis 440. The engine assembly 400 could utilize the exhaust system reflector 380 used by the engine 310 of FIGS. 7*a* and 7*b*, which will now be addressed.

Figure 7A:
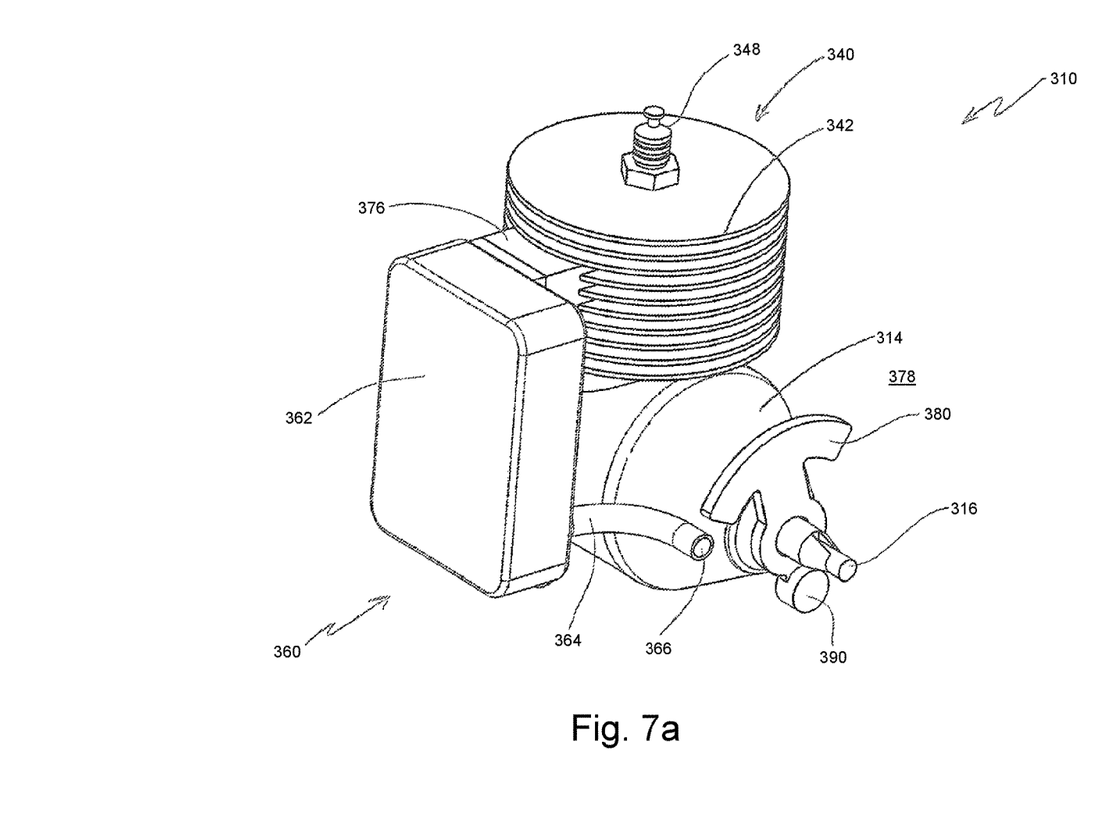
FIG. 7a is a perspective view of one embodiment of an internal combustion engine with an exhaust system reflector, with the exhaust system reflector being in a non-reflecting position for acoustic emissions being discharged from the exhaust system.
Figure 7B:
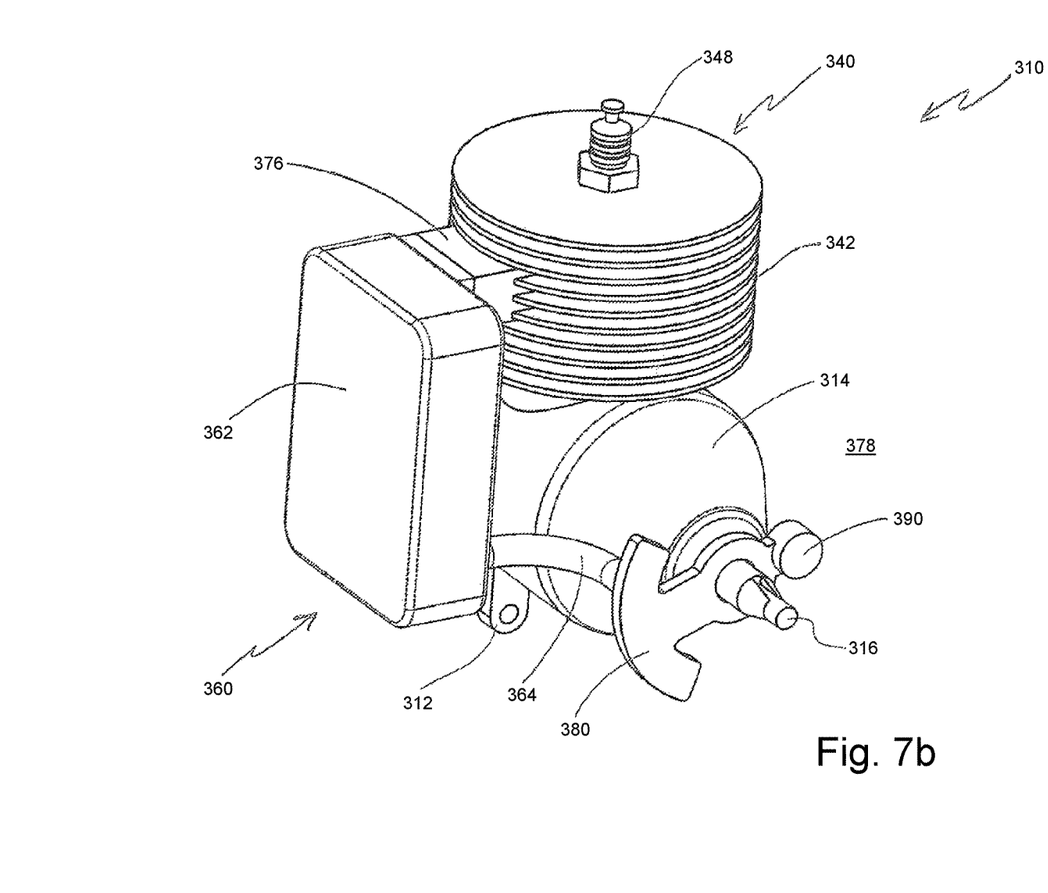
FIG. 7b is another perspective view of the internal combustion engine of FIG. 7a, with the exhaust system reflector being in a reflecting position for acoustic emissions being discharged from the exhaust system.

FIGS. 7*a* and 7*b* illustrate one embodiment of an internal combustion engine 310 that may be used by the engine assembly 400 of FIGS. 6*a*-6*c*. Such an engine 310 may be used in the propulsion of unmanned aerial vehicles, radio-controlled model aircraft, watercraft, and the like. The engine 310 includes a crankshaft 316, an engine case 314, a cylinder 340 (which may include one or more cooling fins 342 for removing heat generated during operation of the engine 310), one or more spark plugs or other igniters 348, an exhaust system 360, an exhaust system reflector 380 located downstream of the exhaust system 360, and a counterweight 390. The exhaust system reflector 380 and associated counterweight 390 may not be required for all applications. One or more engine mounts 312 may be utilized for securing the engine 310 relative to a vehicle of any appropriate type, such as an unmanned aerial vehicle, or relative to any appropriate supporting structure. Rotation of the crankshaft 316 may rotate a propeller (e.g., propeller 304 for the engine assembly 300), may rotate an axle or propulsor (in the case of a watercraft), or the like.

The exhaust system 360 for the engine 310 includes a muffler 362 that receives a discharge or exhaust/exhaust flow from the cylinder 340 during operation of the engine 310 and via an exhaust header 376 that fluidly interconnects the cylinder 340 and the muffler 362. An exhaust conduit 364 (e.g., a tailpipe or stinger) extends from the muffler 362 and includes an open end or exhaust discharge port 366. As such, exhaust from the cylinder 340 flows into/through the header 376, then into/through the muffler 362, and then into/through the exhaust conduit 364 such that the exhaust exits through the open end 366 of the exhaust conduit 364 and into the atmosphere 378.

The exhaust flowing out of the exhaust system 360 through the open end 366 of the exhaust conduit 364 may be characterized as including two primary components—a bulk exhaust gas flow and acoustic emissions (e.g., one or more acoustic waves). The exhaust system reflector 380 is used by the engine 310 to force at least a part of the acoustic emissions (after having exited the exhaust system 360 through the open end 366 of the exhaust conduit 364, or at least after having reached the open end 366 of the exhaust conduit 364 back into the exhaust conduit 364 (via its open end 366) and preferably then back into the muffler 362. This reflection and/or obstruction of at least part of the acoustic emissions should dampen the acoustic emissions (e.g., further lower the acoustic emissions from operation of the engine 310; accommodate additional acoustic wave destructive interference) more than if the acoustic emissions make a single pass through the muffler 362 in proceeding from the cylinder 340 to the exhaust conduit 364. In addition to the foregoing, the reflector 380 should also be sized and timed (relative to the position of the open end 366 of the exhaust conduit 364) to reduce the potential of an unacceptable amount of the bulk exhaust gas flow being redirected or obstructed by the reflector 380, which could generate a back pressure in the muffler 362 and the cylinder 340, which in turn could adversely affect the operational performance of the engine 310. Preferably at most only a very minor amount of the bulk exhaust gas flow is reflected or obstructed by the exhaust system reflector 380 at any time. As such, the reflector 380 may also be referred to as an acoustic emissions valve 380 that is positioned downstream of the exhaust system 360. Such an acoustic emissions valve 380 may be moved into a position (by the crankshaft 316) so as to reflect or obstruct acoustic emissions, but may be moved out of this position (by the crankshaft 316) so as to not obstruct the bulk exhaust gas flow that has exited the exhaust system 360.

The exhaust system reflector 380 may be integrated with the crankshaft 316 in any appropriate manner so that the exhaust system reflector 380 and the crankshaft 316 rotate in unison—the reflector 380 will rotate 360° each time that the crankshaft 316 rotates 360° for the case of a single cylinder head engine configuration. The reflector 380 could be separately attached to the crankshaft 316 in any appropriate manner, the reflector 380 could actually be part of the crankshaft 316, or the like. The counterweight 390 may also be incorporated by the crankshaft 316 in any appropriate manner so that the counterweight 390 and the crankshaft 316 also rotate in unison—the counterweight 390 will rotate 360° each time that the crankshaft 316 rotates 360° in the case of this single cylinder head configuration. The counterweight 390 could be separately attached to the crankshaft 316 in any appropriate manner, the counterweight 390 could actually be part of the crankshaft 316, or the like. In the illustrated embodiment, the counterweight 390 is mounted 180° from the reflector 380 relative to a rotational axis of the crankshaft 316 (e.g., the counterweight 390 and reflector 380 are disposed in opposing relation relative to the crankshaft 316). The counterweight 390 functions to maintain an appropriate rotational balance for the crankshaft 316. Other configurations where rotation of the crankshaft 316 moves the reflector 380 in the manner to be described herein may be utilized by the engine 310.

The reflector 380 is located outside of the exhaust system 360. The exhaust system 360 discharges to the atmosphere 378. As such, the reflector 380 is located within the atmosphere 378. In order to reflect at least part of the acoustic emissions back into the exhaust system 360, but to not reflect any substantial portion of the bulk exhaust gas flow back into the exhaust system 360, the reflector 380 is rotated into and out of alignment with the open end 366 of the exhaust conduit 364 through rotation of the crankshaft 316. "In alignment" in relation to the relative positioning of the reflector 380 and the open end 366 of the exhaust conduit 364 means that at least part the flow out of the open end 366 of the exhaust conduit 364 impacts the reflector 380 in a manner that reflects at least part of this flow back into the exhaust system 360 (where this flow is in the form of acoustic emissions in this instance). "Out of alignment" in relation to the relative positioning of the reflector 380 and the open end 366 of the exhaust conduit 364 means that the flow out of the open end 366 of the exhaust conduit 364 does not impact the reflector 380 in a manner that obstructs flow out of the exhaust system 360 (where this flow is in the form of the bulk exhaust gas flow in this instance). It should be appreciated that in certain instances the reflector 380 will be blocking/reflecting only a portion of the flow exiting the exhaust system 360 (e.g., as the reflector 380 is being rotated into alignment with the open end 366 of the exhaust conduit 364, and where the flow in this instance is in the form of acoustic emissions).

Figure 7C:
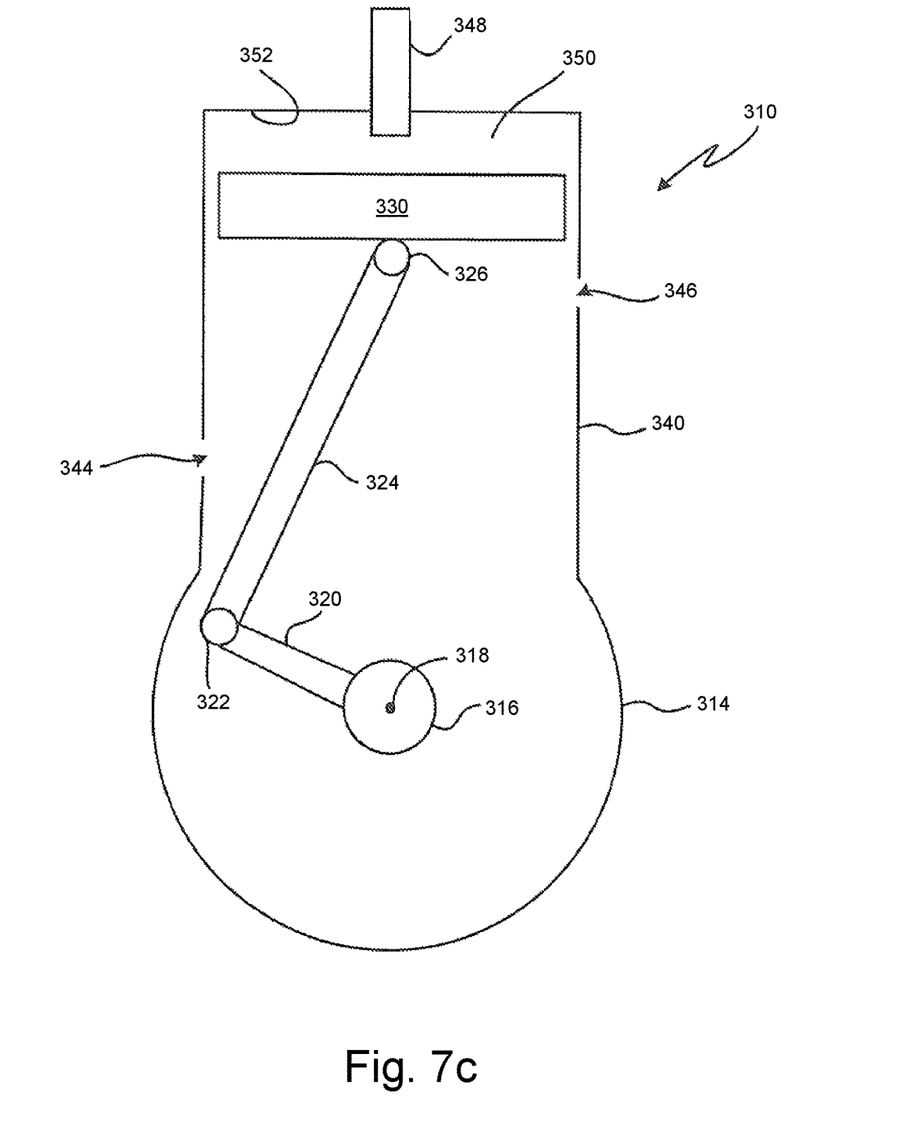
FIG. 7c is a schematic of one configuration of a cylinder for the internal combustion engine of FIG. 7a, along with a corresponding piston.

A schematic of a portion of the internal combustion engine 310 is presented in FIG. 7c. The engine 310 may use one or more cylinders 340, and furthermore may be of a two-cycle configuration. A piston 330 reciprocates within the cylinder 340. In this regard, a connecting rod 320 is appropriately fixed relative to a crankshaft 316 and extends to a pivot 322. A piston rod 324 extends from the pivot 322 to another pivot 326 associated with the piston 330. As such, rotation of the crankshaft 316 about its rotational axis 318 will drive the piston 330 up and down in alternating fashion (in the view shown in FIG. 7c).

The cylinder 340 includes an intake port 344 and an exhaust port 346. One or more valves may be associated with one or more of the ports 344, 346. An air/fuel mixture may be directed into the engine case 314 through the intake port 344 during movement of the piston 330 from a bottom dead center position toward a top dead center position (after the piston 330 passes the intake port 344). This movement of the piston 330 also compresses the air/fuel mixture that is contained within the combustion chamber 350 (located between the piston 330 and a closed end 352 of the cylinder 340, and directed into the chamber 350 through the intake port 344/engine case 314). At some point in time during the movement of the piston 330 toward its top dead center position, the piston 330 will isolate the exhaust port 346 from the combustion chamber 350.

When the piston 330 reaches (or is at least near) its top dead center position, a spark plug or igniter 348 ignites the air/fuel mixture within the combustion chamber 350, which drives the piston 330 from its top dead center position back toward its bottom dead center position. At some point in time during the movement of the piston 330 toward its bottom dead center position, the exhaust port 346 will be exposed to the combustion chamber 350 to allow a flow of exhaust out of the combustion chamber 350, through the exhaust port 346, and into the above-discussed exhaust system 360 (e.g., into/through the exhaust header 376, and then into/through the muffler 362, and then into/through the exhaust conduit 364). Movement of the piston 330 toward its bottom dead center position will at some point in time compress the air/fuel mixture that has previously entered the engine case 314 through the intake port 344.

The invention has been described in an illustrative manner and it is to be understood that the terminology which has been used is intended to be in the nature of words of description rather than of limitation. Other embodiments and configurations of the invention are possible during the continued development of the current desired small engine vibration isolation and engine mounting applications. The following claims are also in accordance with the invention.

What is claimed is:

1. An engine assembly, comprising:
   an engine comprising a crankcase housing; and
   an engine mounting system comprising a mounting base and a plurality of mounting legs that extend between said crankcase housing and said mounting base, wherein each mounting leg of said plurality of mounting legs comprises a crankcase arm and a vibration damping subassembly;
   wherein said crankcase arm for each said mounting leg is integrally formed with said crankcase housing and extends from said crankcase housing at least generally in the direction of said mounting base;
   wherein said mounting base comprises a separate mounting pad for each said mounting leg, wherein each said mounting pad of said mounting base is disposed in a different orientation than every other said mounting pad of said mounting base.

2. The engine assembly of claim 1, wherein said crankcase housing and each said crankcase arm are formed from a common casting or machined from a single billet.

3. The engine assembly of claim 1, wherein each said crankcase arm disposes said crankcase housing and said mounting base in spaced relation along and relative to a reference axis, and wherein said plurality of mounting legs are spaced about said reference axis.

4. The engine assembly of claim 3, wherein at least part of each said crankcase arm diverges away from said reference axis proceeding in a direction of said mounting base.

5. The engine assembly of any of claim 1, wherein each said crankcase arm is in the form of a cantilever relative to said crankcase housing.

6. The engine assembly of claim 1, wherein each said vibration damping subassembly comprises a plurality of vibration dampers that are disposed between a corresponding said crankcase arm and said mounting base and in spaced relation to one another.

7. The engine assembly of claim 1, wherein each said crankcase arm comprises a crankcase arm flange on a free end of said crankcase arm, wherein each said vibration damping subassembly comprises:
   a first vibration damper disposed on a side of said crankcase arm flange that at least generally projects in a direction of said crankcase housing, wherein each said first vibration damper contacts its corresponding said crankcase arm flange; and
   a cap disposed over said first vibration damping member.

8. The engine assembly of claim 7, wherein each said vibration damping subassembly further comprises a second vibration damper disposed on an opposite side of said crankcase arm flange in relation to its corresponding said first vibration damper, wherein each said second vibration damper contacts its corresponding said crankcase arm flange.

9. The engine assembly of claim 8, wherein each said vibration damping subassembly further comprises a housing, wherein a first end of each said housing comprises a tip that extends within its corresponding said second vibration damper, and wherein each said housing is retained in a fixed position relative to its corresponding said crankcase arm flange.

10. The engine assembly of claim 9, wherein each said vibration damping subassembly further comprises at least one vibration damper disposed between its corresponding said housing and said mounting base.

11. The engine assembly of claim 1, wherein said mounting base comprises an annular mounting ring.

12. The engine assembly of claim 1, wherein each said mounting pad of said mounting base is oriented to project in a converging relationship relative to every other said mounting pad of said mounting base.

13. The engine assembly of 12, wherein each said mounting pad comprises a flat surface that is disposed orthogonal to a length dimension of its corresponding said mounting leg.

14. The engine assembly of claim 1, wherein said vibration subassembly of a first mounting leg of said plurality of mounting legs is of a first configuration, and wherein said vibration subassembly of a second mounting leg of said plurality of mounting legs is of a second configuration that is different from said first configuration.

15. The engine assembly of claim 14, wherein said plurality of mounting legs further comprises a third mounting leg that is also of said first configuration.

16. The engine assembly of claim 15, wherein said second mounting leg is oriented 180° from a cylinder head that is mechanically interconnected with said crankcase housing.

17. The engine assembly of claim 14, wherein said first mounting leg is stiffer than said second mounting leg.

18. The engine assembly of claim 1, wherein said engine comprises an internal combustion engine.

19. An aerial vehicle comprising the engine assembly of claim 1.

20. The vehicle of claim 19, wherein said aerial vehicle comprises a vehicle body, and wherein said mounting base is detachably secured to said vehicle body.

* * * * *